United States Patent
Helland et al.

(10) Patent No.: US 7,256,239 B2
(45) Date of Patent: *Aug. 14, 2007

(54) POLYMER FILM

(75) Inventors: Irene Helland, Stathelle (NO); Merete Skar, Stathelle (NO); Jani Äärilä, Porvoo (FI); Marja Ora, Porvoo (FI); Markku Vahteri, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/501,625

(22) PCT Filed: Feb. 4, 2003

(86) PCT No.: PCT/GB03/00480

§ 371 (c)(1),
(2), (4) Date: Jan. 18, 2005

(87) PCT Pub. No.: WO03/066699

PCT Pub. Date: Aug. 14, 2003

(65) Prior Publication Data

US 2005/0131187 A1    Jun. 16, 2005

(30) Foreign Application Priority Data

Feb. 4, 2002    (EP) ................... 02002578

(51) Int. Cl.
*C08F 210/16*    (2006.01)

(52) U.S. Cl. ............... 525/240; 525/53; 526/65; 526/160; 526/348; 526/348.1; 428/500; 428/515

(58) Field of Classification Search ............... 526/348, 526/348.1, 65, 160; 525/240, 53; 428/500, 428/515

See application file for complete search history.

(56) References Cited

U.S. PATENT DOCUMENTS

| | | | |
|---|---|---|---|
| 4,508,842 A | 4/1985 | Beran et al. | 502/112 |
| 5,434,010 A | 7/1995 | Smith et al. | 428/520 |
| 5,718,974 A | 2/1998 | Kmiec | 428/383 |
| 5,814,413 A * | 9/1998 | Beerwart | 428/516 |
| 6,130,293 A | 10/2000 | Hitchcock et al. | 525/191 |
| 6,734,265 B1 * | 5/2004 | Dekmezian et al. | 526/119 |
| 2002/0006482 A1 * | 1/2002 | Falla et al. | 428/35.2 |

FOREIGN PATENT DOCUMENTS

| | | |
|---|---|---|
| EP | 0120503 | 10/1984 |
| EP | 0794200 A2 | 9/1997 |
| EP | 0916693 A2 | 5/1999 |
| EP | 1146079 A1 | 10/2002 |
| SU | 585102 | 12/1977 |
| WO | WO92/12182 | 7/1992 |
| WO | WO97/03124 | 1/1997 |
| WO | WO 01/26897 A1 | 4/2001 |
| WO | WO 01/96419 A2 | 12/2001 |

* cited by examiner

*Primary Examiner*—Roberto Rabago
(74) *Attorney, Agent, or Firm*—Ohlandt, Greeley, Ruggiero & Perle L.L.P.

(57) ABSTRACT

A film of a polyethylene produced by polymerization catalysed by a single site catalyst and comprising as comonomers to ethylene at least two $C_{4-12}$ alpha olefins, preferably but-1-ene and hex-1-ene.

23 Claims, 1 Drawing Sheet

POLYMER FILM

FIELD OF THE INVENTION

This invention relates to polyethylene films, in particular heat-sealable films, for use for example in product packaging.

DISCUSSION OF THE BACKGROUND

Polyethylene (PE), in particular linear low density polyethylene (LLDPE), films are widely used for packaging products, for example foodstuffs, liquids (e.g. detergent refills), etc. In such uses, the sealing properties of the film are particularly important. To address this, it is known to incorporate a comonomer in the PE in order to provide a lower melting point component in the polymer and so increase the hot tack property of the film. In this regard, it is known that incorporation of a hexene-ethylene copolymer in the LLDPE provides superior sealing properties to an LLDPE incorporating a butene-ethylene copolymer and that incorporation of an octene-ethylene copolymer provides superior properties to an LLDPE incorporating a hexene-ethylene copolymer.

The use of higher α-olefin comonomers, i.e. $C_4$ or greater α-olefins, however increases the cost of the polymer product and, generally, the efficiency of comonomer incorporation decreases as the carbon content of the comonomer increases, i.e. hexene is less efficiently incorporated than butene and octene is less efficiently incorporated than hexene, etc.

We have now surprisingly found that by incorporating two different α-olefin comonomers a polyethylene film product may be produced which has superior sealing properties to the polyethylenes produced using either of the comonomers as the sole comonomer.

SUMMARY OF THE INVENTION

Thus viewed from one aspect the invention provides a film of a polyethylene produced by polymerization catalysed by a single site catalyst and comprising as comonomers to ethylene at least two $C_{4-12}$ alpha olefins, preferably at least two alpha olefins selected from but-1-ene, hex-1-ene, 4-methyl-pent-1-ene, hept-1-ene, oct-1-ene, and dec-1-ene, particularly but-1-ene and hex-1-ene.

The films of the invention are especially suitable for use as heat sealable films; e.g. 5 or 7 layer co-extruded layer films, e.g. for food packaging and medical packaging applications. They may also be used for industrial FFS (form fill and seal) where a combination of sealing and mechanical properties is important.

DETAILED DESCRIPTION OF THE PREFERRED EMBODIMENT

Figure 1:
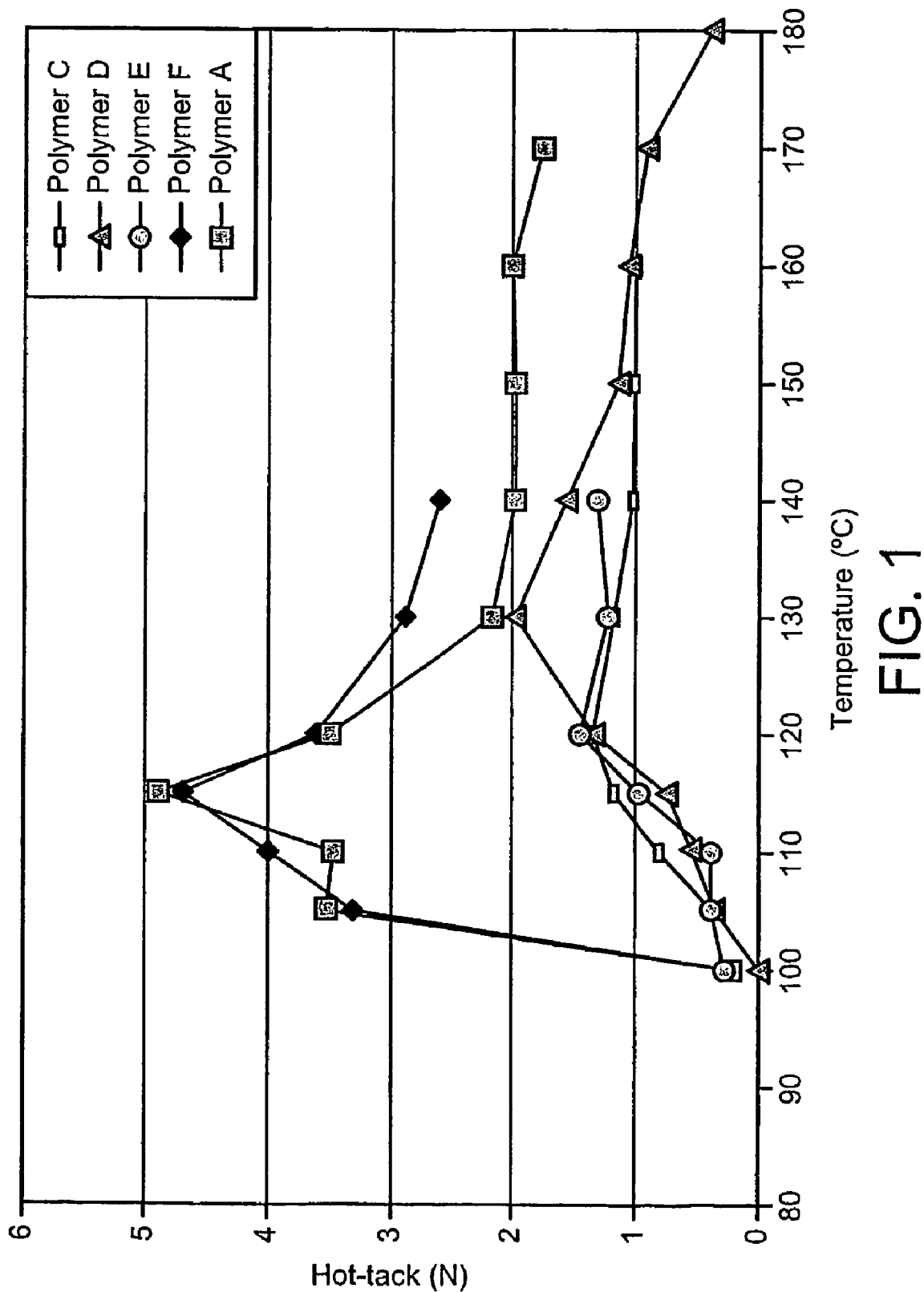
FIG. 1 is a graph plotting hot-tack versus temperature for various polymers.

In many cases, the seal, which is formed between the film and article to be sealed, is put under load while it is still warm. This means that the hot-tack properties of the sealing layer are crucial to ensure a strong seal is formed even before cooling. All heat sealable films have a window within which sealing may occur, i.e. in which the sealing layer becomes partially molten. Traditionally this sealing window has been rather narrow meaning that temperature control during the heat sealing process is critical. The films of the invention allow a broader sealing window so allowing the sealing operation to take place at lower temperature and ensuring that temperature control during heat sealing is less important. By operating at lower temperature there are the benefits that the article to be sealed is not exposed to high temperature and the other layers of the film which may not be involved in sealing are also not exposed to high temperature. There are also economic advantages since lower temperatures are of course cheaper to generate and maintain.

The polyethylene of the film of the invention is typically a mixture of two or more polyethylenes, e.g. produced by blending or by two-or-more stage polymerization reactions. The constituent polyethylenes may be homopolymers, copolymers, terpolymers or polymers of four or more comonomers; preferably however at least one polymer is a terpolymer or at least two polymers are copolymers, in particular in which one monomer, the major component, is ethylene and one or two comonomers, the minor components, are $C_4$ and/or $C_6$ α-olefins. It is especially preferred that the polymer be prepared in a two or more stage polymerization in which in an earlier stage the lower α-olefin comonomer is incorporated and in which in a later stage the higher α-olefin comonomer is incorporated. Nonetheless, it is within the scope of the invention to produce the polymer in a two stage polymerization reaction in which an ethylene homopolymer is produced in the first stage and an ethylene terpolymer is produced in the second-stage or vice versa or in which an ethylene copolymer with the higher α-olefin comonomer is produced in the first stage and an ethylene copolymer with the lower α-olefin comonomer is produced in the second stage. Likewise, an ethylene copolymer may be produced in the first stage and an ethylene terpolymer in the second stage and vice versa.

The expression "homopolymer" of ethylene used herein refers to a polyethylene that consists substantially, i.e. at least 98% by weight, preferably at least 99% by weight, more preferably at least 99.5% by weight, most preferably at least 99.8% by weight, of ethylene.

The ethylene polymers of the polymer film of the invention are produced using a so-called single site catalyst, e.g. a catalyst comprising a metal coordinated by one or more η-bonding ligands. Such η-bonded metals are normally referred to as metallocenes and the metals are typically Zr, Hf or Ti, especially Zr or Hf. The η-bonding ligand is typically an $η^5$-cyclic ligand, i.e. a homo or heterocyclic cyclopentadienyl group optionally with fused or pendant substituents. Such metallocene catalysts have been widely described in the scientific and patent literature for about twenty years. Such metallocene catalysts are frequently used with catalyst activators or co-catalysts, e.g. alumoxanes such as methylaluminoxane, again as widely described in the literature.

The polymer used in the film of the invention preferably is bimodal or multimodal, i.e. its molecular weight profile does not comprise a single peak but instead comprises the combination of two or more peaks (which may or may not be distinguishable) centred about different average molecular weights as a result of the fact that the polymer comprises two or more separately produced components. In this embodiment, a higher molecular weight component preferably corresponds to a copolymer (or terpolymer etc.) of the higher α-olefin comonomer and a lower molecular weight component preferably corresponds to an ethylene homopolymer or a copolymer (or terpolymer etc.) of the lower α-olefin comonomer. Such bimodal ethylene polymers may be prepared for example by two or more stage polymerization or by the use of two or more different polymerization catalysts in a one stage polymerization. Preferably however they are produced in a two-stage polymerization using the same catalyst, e.g. a metallocene catalyst, in particular a slurry polymerization in a loop reactor followed by a gas phase polymerization in a gas phase reactor. A loop reactor—gas phase reactor system is marketed by Borealis A/S, Denmark as a BORSTAR reactor system.

Preferably, the low molecular weight polymer fraction is produced in a continuously operating loop reactor where ethylene is polymerized in the presence of a polymerization catalyst as stated above and a chain transfer agent such as hydrogen. The diluent is typically an inert aliphatic hydrocarbon, preferably isobutane or propane. A $C_4$ to $C_{12}$ α-olefin comonomer is preferably added to control the density of the low molecular weight copolymer fraction.

Preferably, the hydrogen concentration is selected so that the low molecular weight copolymer fraction has the desired melt flow rate. More preferably, the molar ratio of hydrogen to ethylene is between 0.1 and 1.5 mol/kmol, most preferably, between 0.2 and 1.0 mol/kmol.

In the case the target density of the low molecular weight copolymer fraction exceeds 955 kg/m$^3$, it is advantageous to operate the loop reactor using propane diluent in so called supercritical conditions where the operating temperature exceeds the critical temperature of the reaction mixture and the operating pressure exceeds the critical pressure of the reaction mixture. A preferred range of temperature is then from 90 to 110° C. and the range of pressures is from 50 to 80 bar.

The slurry is intermittently or continuously removed from the loop reactor and transferred to a separation unit where at least the chain transfer agents (e.g. hydrogen) are separated from the polymer. The polymer containing the active catalyst is then introduced into a gas phase reactor where the polymerization proceeds in the presence of additional ethylene, comonomer(s) and optionally chain transfer agent to produce the high molecular weight copolymer fraction. The polymer is intermittently or continuously withdrawn from the gas phase reactor and the remaining hydrocarbons are separated from the polymer. The polymer collected from the gas phase reactor is the bimodal terpolymer.

The conditions in the gas phase reactor are selected so that the ethylene polymer has the desired properties. Preferably, the temperature in the reactor is between 70 and 100° C. and the pressure is between 10 to 40 bar. The hydrogen to ethylene molar ratio ranges from preferably 0 to 1 mol/kmol, more preferably 0 to 0.5 mol/kmol and the α-olefin comonomer to ethylene molar ratio ranges from preferably 1 to 100 mol/kmol, more preferably 5 to 50 mol/kmol and most preferably 5 to 30 mol/kmol.

The film of the invention may be prepared using conventional film production techniques. The film will typically be 10 to 1000 μm in thickness, especially 20 to 100 μm. The specific thickness will be selected according to the nature of the product to be packaged by the film and its expected subsequent handling conditions.

The films however are preferably extruded, particularly preferably with a blow up ratio of 2:1 to 4:1.

If desired the film may be multilayered, e.g. as a result of lamination or coextrusion.

In a multilayer film, the other layers may comprise any film grade polymer resin having the desired properties and processabiiity. Examples of such polymers include: barrier layer PA (polyamide) and EVA; polar copolymers of ethylene, such as copolymers of ethylene and vinyl alcohol or copolymers of ethylene and an acrylate monomer; adhesive layers, e.g. ionomers, copolymers of ethylene and ethyl acrylate, etc; HDPE for stiffness; LDPE resins produced in a high-pressure process; LLDPE resins produced by polymerising ethylene and alpha-olefin comonomers in the presence of a Ziegler, chromium or metallocene catalyst; and MDPE resins. The multilayer film however preferably has at least one sealing layer, preferably an outer layer, which is a bimodal ethylene polymer containing at least two other α-olefin comonomers.

Viewed from a further aspect the invention also provides a polyethylene composition for film production, said composition comprising a polyethylene produced by polymerization catalysed by a single site catalyst and having as comonomers to ethylene at least two $C_{4-12}$ alpha olefins, preferably at least two alpha olefins selected from but-1-ene, hex-1-ene, 4-methyl-pent-1-ene, hept-1-ene, oct-1-ene, and dec-1-ene particularly but-1-ene and hex-1-ene.

Viewed from a further aspect the invention provides a product (e.g. foodstuff, a liquid such as detergent, etc) packaged within a heat-sealed film of a polyethylene produced by polymerization catalysed by a single site catalyst and which comprises as comonomers to ethylene at least two $C_{4-12}$ alpha olefins, preferably at least two alpha olefins selected from but-1-ene, hex-1-ene, 4-methyl-pent-1-ene, hept-1-ene, oct-1-ene, and dec-1-ene particularly but-1-ene and hex-1-ene.

The film of the invention preferably either a bimodal terpolymer comprising
  a) a low molecular weight homopolymer of ethylene and
  b) a high molecular weight terpolymer of ethylene, 1-butene and a $C_6$ to $C_{12}$ α-olefin, or a bimodal polymer comprising
  a) a low molecular weight polymer which is a binary copolymer of ethylene and a $C_4$ to $C_{12}$ α-olefin and
  b) a high molecular weight polymer which is either a binary copolymer of ethylene and 1-butene, if the low molecular weight polymer of a) is a binary copolymer of ethylene and a $C_6$ to $C_{12}$ α-olefin, or a terpolymer of ethylene, 1-butene and a $C_6$ to $C_{12}$ α-olefin.

In a preferred embodiment the present invention provides a film of a bimodal polymer with a relatively narrow molecular weight distribution (MWD) and excellent sealing properties, good processability, low permeability and a low level of extractibles. The MWD is preferably 2.5 to 10, especially 3.0 to 8.0.

The expression of modality of a polymer refers to the form of its molecular weight distribution (MWD) curve, i.e. the appearance of the graph of the polymer weight fraction as a function of its molecular weight. If the polymer is produced in a sequential step process i.e. by utilizing reactors coupled in series and using different conditions in each reactor, the different polymer fraction produced in the different reactors will each have their own molecular weight distribution which may considerably differ from each another.

The molecular weight distribution curve of the resulting final polymer can be looked at as the superposition of the molecular weight distribution curve of the polymer fractions which will accordingly show two or more distinct maxima or at least be distinctly broadened compared with the curves of the individual fractions. A polymer showing such a molecular weight distribution curve is called bimodal or multimodal, respectively.

Multimodal, especially bimodal, polymers can be produced according to several processes which are described e.g. in EP-0 517 868 B1 or WO-A-96/18662.

The multimodal polyethylene preferably is produced in a multi stage process in a multi step reaction sequence such as described in EP-0 517 868 B1 and WO-A-96/18662. The contents of these documents are included herein by reference.

In this process, in a first step ethylene is polymerized in a loop reactor in the liquid phase of an inert low boiling hydrocarbon medium. Then the reaction mixture is discharged from the loop reactor and at least the inert hydrocarbon medium is removed from the reaction mixture and the polymers transferred into one or more gas phase reactors where the polymerisation is continued in the presence of gaseous ethylene. The multimodal polymer produced according to this process has a superior homogeneity with respect to the distribution of the different polymer fractions which cannot be obtained e.g. by a polymer mix.

The catalyst for the production of the ethylene polymer may be a single-site catalyst like one of those disclosed in WO 97/28170, WO 00/34341 and WO 00/40620 is used. The contents of these publications are incorporated herein by reference.

The bimodal polymer composition preferably comprises a low molecular weight copolymer fraction and a high molecular weight copolymer fraction. The low molecular weight copolymer fraction, provided that a binary copolymer is used, preferably contains a $C_4$ to $C_{12}$ α-olefin, especially one selected from the group of 1-butene, 1-hexene, 4-methyl-1-pentene, 1-octene and 1-decene. The $C_6$ to $C_{12}$ α-olefin of the high molecular weight copolymer fraction is preferably selected from the group of 1-hexene, 4-methyl-1-pentene, 1-heptene, 1-octene and 1-decene.

The weight average molecular weight of the bimodal polymer is preferably between 50,000 and 250,000 g/mol. The low molecular weight polymer fraction preferably has a weight average molecular weight preferably of 5000 to 100,000 g/mol, more preferably of 10,000 to 70,000 g/mol and the high molecular weight polymer fraction preferably has a weight average molecular weight preferably of 50,000 to 500,000 g/mol, more preferably of 100,000 to 300,000 g/mol.

The molecular weight distribution of the polymer is further characterized by the way of its melt flow rate (MFR) according to ISO 1133 at 190° C. The melt flow rate is preliminary depending on the mean molecular weight. This is, because larger molecules give the material a lower flow tendency than smaller molecules.

An increase in molecular weight means a decrease in MFR value. The melt flow rate is measured in g/10 mm of the polymer discharge under a specified temperature and pressure condition and is a measure of the viscosity of the polymer, which in turn for each type of polymer is mainly influenced by its molecular weight distribution, but also by its degree of branching etc. The melt flow rate measured under a load 2.16 kg (ISO 1133) is denoted as $MFR_2$. In turn, the melt flow rate measured with 21.6 kg is denoted as $MFR_{21}$.

The final bimodal polymer preferably has a melt flow rate $MFR_2$ of 0.3 to 5 g/10 min, more preferably of 0.4 to 3 g/10 min. The low molecular weight polymer fraction preferably has a melt index $MFR_2$ of 50 to 1000 g/10 min, more preferably of 50 to 300 g/10 min.

The melt flow rate and the density of the material are decisive for strength properties, while the density only is decisive for the melting point, surface hardness, permeability and water absorption.

The density of the final bimodal polymer is preferably 905 to 940 $kg/m^3$, more preferably of 905 to 930 $kg/m^3$. The density of the low molecular weight polymer fraction is preferably 925 to 945 $kg/m^3$, more preferably 925 to 940 $kg/m^3$.

The bimodal polymer according to the present invention preferably comprises 30 to 70%, more preferably 35 to 60% and most preferably 38 to 55% by weight of the low molecular weight copolymer fraction with regard to the total composition.

The overall comonomer content in the polymer is preferably 0.1 to 10% mol, preferably 0.5 to 7% mol and in the low molecular weight polymer the comonomer content is preferably 0 to 3.0% mol, preferably 0 to 2.5% mol. In the high molecular weight polymer the comonomer content is preferably 0.1 to 10% mol, preferably 0.1 to 7% mol. Comonomer contents may be measured by nmr.

Further, the molecular weight of the high molecular weight copolymer fraction should be such that when the low molecular weight copolymer fraction has the melt index and density specified above, the final bimodal polymer has the melt index and density as discussed above.

In addition to the polymer itself, the composition and film of the invention may also contain antioxidants, process stabilizers, pigments and other additives known in the art. Moreover, the bimodal SSC ethylene polymer with two other α-olefin comonomers may be blended with other polymers while retaining sealing and mechanical properties suitable for the desired end-uses of the polymer film. Examples of such further polymers which may be used include LDPE, HDPE, MDPE, LLDPE, EMA, EBA, and EVA. Typically, up to about 50% wt of the overall polymer may be constituted by much further polymers, more preferably up to 30% wt in the case of HDPE, MDPE or LLDPE. The inclusion in this way of LDPE is especially favourable in view of the significant improvement in the optical properties of the film which can be obtained.

Where films are to be used for packaging certain products, in particular foodstuffs, it is especially important that the film has high clarity and gloss. Where films are made only of SSC polymers (i.e. polymers produced using single site catalysts), they often are relatively hazy and/or matt in appearance. This can be addressed by blending in with the SSC polyethylene an LDPE, e.g. such that up to 5% wt, more preferably 1 to 5% wt, especially 3 to 4% wt, particularly about 3.5% wt of the polymer blend is the LDPE. Surprisingly we have also found that LDPE of relatively high density, e.g. 925 to 932 $kg/m^3$, is particularly effective in this regard. An example of such an LDPE is available commercially from Borealis A/S under the trade name Himod LDPE which is produced by tubular high pressure processes.

This effect of the relatively high density LDPE on optical properties of PE film is quite unexpected as it would have been expected that the higher the density of the LDPE additive the less the improvement in optical properties would be. Accordingly, viewed from a further aspect the invention provides the use of a relatively high density LDPE, e.g. having a density of 925 to 932 $kg/m^3$, as an additive in a polyethylene composition (e.g. as 1 to 5% wt of the composition) for film production to improve the optical characteristics of the film produced therefrom.

Examples of stabilizers are hindered phenols, hindered amines, phosphates, phosphites and phosphonites.

Examples of pigments are carbon black, ultra marine blue and titanium dioxide.

Examples of other additives are e.g. clay, talc, calcium carbonate, calcium stearate, zinc stearate and antistatic additives like those sold under trademark name Lankrostat.

The present invention will now be illustrated further by the following non-limiting Examples and the accompanying drawing in which FIG. 1 is a plot of hot tack against temperature for films blown from the polymers of Example 2 and four comparison polymers.

Hot Tack:

"Hot tack" is a method for measuring the strength of heat seal of film and lamination immediately after the sealing operation. This property is measured on a DTC International Hot tack tester model 52-D, w-4236.

Samples are cut with a width of 15 mm. The sealing time is 0.5 sec, a delay time is 0.1 sec and the sealing pressure is 90N. The sealing at different temperatures are measured and for each test temperature 5 parallels are taken. The specimens have been conditioned, allowed to stand, at ambient temperature for a minimum of 24 hours before testing.

MFR

MFR was measured according to ISO 1133 at 190° C. The load has been indicated as a subscript, i.e. $MFR_2$ denotes the measurement has been carried out under a load of 2.16 kg and $MFR_{21}$ denotes the measurement has been carried out under a load of 21.6 kg, respectively.

FRR

Flow Rate Ratio (FRR) is a ratio of two melt flow rates, measured under different loads. The loads are denoted in the subscript. Thus, $FRR_{21/2}$ denotes the ratio of $MFR_{21}$ to $MFR_2$.

MWD:

The weight-average molecular weight $M_w$, and the molecular weight distribution ($MWD=M_w/M_n$, where $M_n$ equals number-average molecular weight) is measured by a method based on ISO/TC61/SC5 N 5024. The main difference between this method and the method used is the temperature; the ISO method being at room temperature while the method used being at 140° C. The ratio of $M_w$ and $M_n$ is a measure of the broadness of the distribution, since each is influenced by the opposite end of the "population".

Density:

Density is measured according to ISO 1183/D.

Extractables in Hexane:

Hexane extractions are carried out using ASTM D5227.

Oxygen Permeability:

Oxygen permeability is carried out using ASTM D3985.

Water Permeability:

Water Vapour Transmission Rate is measured according to ASTM F1249.

Rheology:

The rheological properties of the polymers were determined using Rheometrics RDA II Dynamic Rheometer. The measurements were carried out at 190° C. under a nitrogen atmosphere. The measurement give storage modulus (G') and loss modulus (G") together with absolute value of complex viscosity ($\eta^*$) as a function of frequency ($\omega$) or absolute value of complex modulus (G*), where:

$$\eta^* = ((G'^2 + G''^2)/\omega)^{1/2} \quad G^* = (G'^2 + G''^2)^{1/2}$$

In the present method, viscosity at low shear rates (0.05 rad/s) is plotted against viscosity at high shear rates (300 rad/s) as a measure of processability; a high viscosity at low shear rates combined with a low viscosity at high shear rates giving superior processability.

EXAMPLE 1

134 grams of a metallocene complex (bis(n-butyldicyclopentadienyl) hafnium dichloride supplied by Witco as TA02823, containing 0.36% by weight Hf) and 9.67 kg of a 30% solution of methylalumoxane (MAO) in toluene (supplied by Albemarle) were combined and 3.18 kg dry, purified toluene was added. The thus obtained complex solution was added onto 17 kg silica carrier Sylopol 55 SJ (supplied by Grace) by very slow uniform spraying over 2 hours. The temperature was kept below 30° C. The mixture was allowed to react for 3 hours after complex addition at 30° C.

EXAMPLE 2

Polymer A

A continuously operating loop reactor having a volume of 500 $dm^3$ was operated at 85° C. temperature and 60 bar pressure. Into the reactor were introduced propane diluent, ethylene, 1-butene comononer, hydrogen and the polymerisation catalyst described in Example 1 in such amounts that the ethylene concentration in the liquid phase of the loop reactor was 5.8% by mole, the ratio of hydrogen to ethylene was 0.48 mol/kmol, the ratio of 1-butene to ethylene was 118 mol/kmol and the polymer production rate in the reactor was 30 kg/h. The thus formed polymer had a melt index $MFR_2$ of 79 g/10 min and a density of 938 $kg/m^3$.

The slurry was intermittently withdrawn from the reactor by using a settling leg and directed to a flash tank operated at a temperature of about 50° C. and a pressure of about 3 bar.

From the flash tank, the polymer powder, containing a small amount of residual hydrocarbons, was transferred into a gas phase reactor operated at 75° C. temperature and 20 bar pressure. Into the gas phase reactor were also introduced additional ethylene, 1-hexene comonomer and nitrogen as inert gas in such amounts that the ethylene concentration in the circulating gas was 37% by mole, the ratio of 1-hexene to ethylene was 10 mol/kmol and the polymer production rate was 37 kg/h. The concentrations of 1-butene and hydrogen were so low that they could not be detected by the on-line gas chromatograph which was used to monitor the gas composition.

The polymer collected from the gas phase reactor was stabilised by adding 0.15% wt of stabilizer, Irganox B561, to the powder. The stabilised polymer was then extruded and pelletised with a CIM90P extruder, manufactured by Japan Steel Works.

The production split between the loop and gas phase reactors was thus 45/55. The polymer pellets had a melt index $MFR_2$ of 0.78 g/10 min, a density of 919 $kg/m^3$, a 1-butene content of 1.4% by weight, a content of 1-hexene of 7.1% by weight, a weight average molecular weight $M_w$ of 131000 g/mol, a number average molecular weight $M_n$ of 28200 g/mol and a z-average molecular weight $M_z$ of 333000 g/mol. Further, the polymer had a zero shear rate viscosity $\eta_o$ of 11700 Pa·s and a shear thinning index $SHI_{0/100}$ of 3.9.

EXAMPLE 3

Polymer B

The procedure of Example 2 was repeated except that the process conditions were adjusted as shown in Table 1.

The polymer pellets had a melt index $MFR_2$ of 0.76 g/10 min, a density of 919 kg/m³, a 1-butene content of 2.0% by weight, a content of 1-hexene of 6.8% by weight, a weight average molecular weight $M_w$ of 126000 g/mol, a number average molecular weight $M_n$ of 16600 g/mol and a z-average molecular weight $M_z$ of 349000 g/mol. Further, the polymer had a zero shear rate viscosity $\eta_0$ of 12900 Pa·s and a shear thinning index $SHI_{0/100}$ of 5.4.

TABLE 1

|  | Example | | |
|---|---|---|---|
|  | 2 | 3 | 6 |
| $C_2$ in loop, mol-% | 5.8 | 7.0 | 5.5 |
| $H_2/C_2$ in loop, mol/kmol | 0.48 | 0.78 | 0.53 |
| $C_4/C_2$ in loop, mol/kmol | 118 | 139 | 123 |
| $C_6/C_2$ in loop, mol/kmol | 0 | 0 | 0 |
| $MFR_2$ of loop polymer, g/10 min | 79 | 340 | 145 |
| Density of loop polymer, kg/m³ | 938 | 937 | 939 |
| Production rate in loop, kg/h | 30 | 30 | 30 |
| $C_2$ in gpr, mol-% | 37 | 43 | 32 |
| $H_2/C_2$ in gpr, mol/kmol | * | * | * |
| $C_4/C_2$ in gpr, mol/kmol | * | * | * |
| $C_6/C_2$ in gpr, mol/kmol | 10 | 12 | 10 |
| Production rate in gpr, kg/h | 37 | 30 | 36 |
| Production split, loop/gpr | 45/55 | 50/50 | 44/56 |

* indicates that the level was too low to be detected by GC

The characteristics of the polymers of Examples 2, 3 and 6 are set out in Table 2 below.

TABLE 2

|  | Polymer | | |
|---|---|---|---|
|  | A | B | L |
| $MFR_2$ loop (LMW component) [g/10 min] | 79 | 340 | 145 |
| Density (LMW component) (kg/m³) | 938.4 | 936.6 | 939 |
| Split (LMW/HMW) | 45/55 | 50/50 | 44/56 |
| Final $MFR_2$ (g/10 min) | 0.78 | 0.76 | 0.86 |
| $FRR_{21/2}$ | 38 | 55 | 42 |
| Final Density (kg/m³) | 919 | 919 | 919 |
| MWD | 4.6 | 7.6 | 5.7 |
| Extractibles in hexane (% wt) | 0.3 | 0.8 | 0.4 |
| Oxygen permeability (cm³/m² · 24 h) | 6425 | 5350 | — |
| Water permeability (g/m² · 24 h) | 9.5 | 8.4 | — |

EXAMPLE 4

Film Production

Using the polymers of Examples 2 and 3 and, by way of comparison, (C) a LDPE (FT5230 from Borealis A/S), (D) a bimodal ZN-LLDPE with but-1-ene as comonomer (FB2230 from Borealis), (E) a ZN-LLDPE with but-1-ene as a comonomer (FG 5190 from Borealis A/S) and (F) a SSC-PE with oct-1-ene as a comonomer (Elite 5400 from DOW), films were extruded on a Reifenhauser film line to a thickness of 40 µm, with a die diameter of 150 mm, a screw diameter of 70 mm, a BUR (blow-up ratio) at 2.5:1, a die gap of 2.0 mm and a die temperature of 210° C.

The hot tack for the films were measured and are plotted in FIG. 1. As can be seen, the films according to the invention are comparable to those using PE with octene as a comonomer and superior to those using lower α-olefin comonomers.

EXAMPLE 5

Polymer Blend

The polymer of Example 3 was blended with 4% wt of an autoclave produced LDPE (FA 5223 from Borealis A/s, $MFR_2$ 1.2 g/10 min, 922 kg/m³ density) or with 4% wt of an autoclave produced LDPE (CA 8200 from Borealis A/s, $MFR_2$ 7.5 g/10 min, density 920 kg/m³). The resulting blends, polymers (G) and (H) respectively, and Polymer B itself were processed to form films of 40 µm thickness using an Ankutec film blower, 30 mm, LD ratio 25:1, die diameter 50 mm, die gap 2.4 mm. The gloss and haze were assessed by ASTM D2457 and ASTM D1003 respectively and the results are set out in Table 3 below:

TABLE 3

|  | Polymer | | |
|---|---|---|---|
|  | G | H | B |
| Gloss 60° (%) | 71 | 63.6 | 39.1 |
| Haze (%) | 15.9 | 15.4 | 31.9 |

The polymer of Example 6 was similarly blended with 4% wt of FA5223 or 4% wt of a tubular LDPE with relatively high density (FA5270 from Borealis A/S) or with 4% wt of CA8200. The resulting blends, polymers (I), (J) and (K) respectively, were similarly blown and the haze and gloss were similarly assessed. The results are set out in Table 4 below:

TABLE 4

|  | Polymer | | | |
|---|---|---|---|---|
|  | I | J | K | L |
| Gloss 60° (%) | 88.9 | 95.6 | 72.4 | 45.7 |
| Haze (%) | 12.7 | 11.6 | 14.8 | 29.5 |

EXAMPLE 6

Polymer L

The procedure of Example 2 was repeated except that the process conditions were adjusted as shown in Table 1.

The polymer pellets had a melt index $MFR_2$ of 0.86 g/10 min, a density of 919 kg/m³, a 1-butene content of 1.5% by weight, a content of 1-hexene of 7.3% by weight, a weight average molecular weight $M_w$ of 127000 g/mol, a number average molecular weight $M_n$ of 22200 g/mol and a z-average molecular weight $M_z$ of 324000 g/mol. Further, the polymer had a zero shear rate viscosity $\eta_0$ of 11000 Pa·s and a shear thinning index $SHI_{0/100}$ of 4.

The invention claimed is:

1. A film of a bimodal polyethylene produced by polymerization catalysed by a single site catalyst having more than one $\eta^5$-cyclic ligand said bimodal polyethylene comprising
   ai) a lower molecular weight homopolymer of ethylene and bi) a higher molecular weight terpolymer of ethylene, 1-butene and a $C_6$ to $C_{12}$ alpha-olefin, or aii) a lower molecular weight polymer which is a binary copolymer of ethylene and a comonomer selected from $C_4$ to $C_{12}$ alpha-olefins and bii) a higher molecular weight polymer which is either a binary copolymer of ethylene and 1-butene, if the lower molecular weight polymer of aii) is a binary copolymer of ethylene and a $C_6$ to $C_{12}$ alpha-olefin, or a terpolymer of ethylene, 1-butene and a comonomer selected from $C_6$ to $C_{12}$ alpha-olefin;

wherein all components are made by the same catalyst.

2. A film as claimed in claim 1 wherein the $C_6$ to $C_{12}$ alpha-olefin of part bi) is selected from the group consisting of: hex-1-ene, 4-methyl-pent-1-ene, hept-1-ene, oct-1-ene and dec-1-ene.

3. A film as claimed in claim 1 wherein the comonomer of part aii) is selected from the group consisting of: but-1-ene and hex-1-ene.

4. A film as claimed in claim 1 wherein the lower molecular weight component constitutes from 30 to 70% wt of the polyethylene.

5. A film as claimed in claim 1 wherein the comonomer content of said polyethylene is 0.1 to 10% mol.

6. A film as claimed in claim 1 wherein the density of said polyethylene is from 905 to 930 kg/m³.

7. A film as claimed in claim 1 wherein the weight average molecular weight of said polyethylene is 50000 to 250000 g/mol.

8. A film as claimed in claim 1 wherein the molecular weight distribution of said polyethylene is from 3 to 8.

9. A film as claimed in claim 1 wherein the $MFR_2$ of said polyethylene is 0.4 to 3 g/10 min.

10. A film as claimed in claim 1 wherein said polyethylene is blended with a further polymer.

11. A film as claimed in claim 10 wherein said further polymer is a low density polyethylene (LDPE).

12. A film as claimed in claim 1 comprising a plurality of layers.

13. A film as claimed in claim 1 produced by extrusion using a blow up ratio of from 2:1 to 4:1.

14. A film as claimed in claim 1 wherein said bimodal polyethylene comprises aii) a lower molecular weight polymer which is a binary copolymer of ethylene and a comonomer selected from $C_4$ to $C_{12}$ alpha-olefin and bii) a higher molecular weight polymer which is either a binary copolymer of ethylene and 1-butene, if the lower molecular weight polymer of aii) is a binary copolymer of ethylene and a $C_6$ to $C_{12}$ alpha-olefin, or a terpolymer of ethylene, 1-butene and a comonomer selected from $C_6$ to $C_{12}$ alpha-olefin.

15. A polyethylene composition for film production, said composition comprising a bimodal polyethylene produced by polymerization catalysed by a single site catalyst having more than one $\eta^5$-cyclic ligand comprising ai) a lower molecular weight homopolymer of ethylene and bi) a higher molecular weight terpolymer of ethylene, 1-butene and a $C_6$ to $C_{12}$ alpha-olefin, or aii) a lower molecular weight polymer which is a binary copolymer of ethylene and a comonomer selected from $C_4$ to $C_{12}$ alpha-olefins and bii) a higher molecular weight polymer which is either a binary copolymer of ethylene and 1-butene, if the lower molecular weight polymer of aii) is a binary copolymer of ethylene and a $C_6$ to $C_{12}$ alpha-olefin, or a terpolymer of ethylene, 1-butene and a comonomer selected from $C_6$ to $C_{12}$ alpha-olefin;

wherein all components are made by the same catalyst.

16. A composition as claimed in claim 15 wherein the $C_6$ to $C_{12}$ alpha-olefin of part bi) is selected from the group consisting of: hex-1-ene, 4-methyl-pent-1-ene, hept-1-ene, oct-1-ene and dec-1-ene.

17. A composition as claimed in claim 16 comprising a blend of said polyethylene and a further polymer.

18. A composition as claimed in claim 17 wherein said further polymer is a low density polyethylene (LDPE).

19. A product packaged within a heat-sealed film of a bimodal polyethylene produced by polymerization catalysed by a single site catalyst having more than one $eta^5$-cyclic ligand comprising ai) a lower molecular weight homopolymer of ethylene and bi) a higher molecular weight terpolymer of ethylene, 1-butene and a $C_6$ to $C_{12}$ alpha-olefin, or aii) a lower molecular weight polymer which is a binary copolymer of ethylene and a comonomer selected from $C_4$ to $C_{12}$ alpha-olefin and bii) a higher molecular weight polymer which is either a binary copolymer of ethylene and 1-butene, if the lower molecular weight polymer of aii) is a binary copolymer of ethylene and a $C_6$ to $C_{12}$ alpha-olefin, or a terpolymer of ethylene, 1-butene and a comonomer selected from $C_6$ to $C_{12}$ alpha-olefin;

wherein all components are made by the same catalyst.

20. A product as claimed in claim 19 wherein the $C_6$ to $C_{12}$ alpha-olefin of part bi) is selected from the group consisting of: hex-1-ene, 4-methyl-pent-1-ene, hept-1-ene, oct-1-ene and dec-1-ene.

21. A product as claimed in claim 19 being a packaged foodstuff or liquid.

22. A composition as claimed in claim 15 wherein the comonomer of part aii) is selected from but-1-ene and hex-1-ene.

23. A product as claimed in claim 19 wherein the comonomer of part aii) is selected from but-1-ene and hex-1-ene.

* * * * *